United States Patent

Dorman

[11] Patent Number: 5,899,139
[45] Date of Patent: * May 4, 1999

[54] MOBILE PINESTRAW BALER

[76] Inventor: Clark Dorman, 307 Live Oak St., Tabor City, N.C. 28463

[ * ] Notice: This patent issued on a continued prosecution application filed under 37 CFR 1.53(d), and is subject to the twenty year patent term provisions of 35 U.S.C. 154(a)(2).

[21] Appl. No.: 08/800,854

[22] Filed: Feb. 14, 1997

[51] Int. Cl.⁶ .............................. B65B 13/04; A01F 15/04
[52] U.S. Cl. ........................ 100/24; 100/100; 100/245; 100/250; 100/269.15
[58] Field of Search ................................ 100/3, 8, 24, 25, 100/100, 240, 245–250, 269.15, 17, 18, 19 R

[56] References Cited

U.S. PATENT DOCUMENTS

| | | | |
|---|---|---|---|
| 236,253 | 1/1881 | Phares | 100/100 |
| 325,843 | 9/1885 | Lathrop | 100/250 |
| 2,476,672 | 7/1949 | Martin . | |
| 2,775,930 | 1/1957 | Anderson et al. | 100/250 |
| 3,577,911 | 5/1971 | Morse | 100/269.15 |
| 3,691,967 | 9/1972 | Mettetal, Jr. | 100/100 |
| 3,827,353 | 8/1974 | Isberg . | |
| 4,136,610 | 1/1979 | Tyler, Jr. . | |
| 4,150,613 | 4/1979 | Smee et al. . | |
| 4,170,934 | 10/1979 | Osterling et al. . | |
| 4,175,487 | 11/1979 | Molitorisz . | |
| 4,294,169 | 10/1981 | Baird . | |
| 4,401,022 | 8/1983 | Vissers et al. . | |
| 4,467,712 | 8/1984 | Fincham . | |
| 4,548,131 | 10/1985 | Williams . | |
| 4,991,498 | 2/1991 | McCurdy | 100/8 |
| 5,291,825 | 3/1994 | Dietrich | 100/250 |

OTHER PUBLICATIONS

Two (2) photographs of a "basic pinestraw baler", No Date.

Primary Examiner—Stephen F. Gerrity
Attorney, Agent, or Firm—Michael E. Mauney

[57] ABSTRACT

A device for baling pinestraw including a compressive chamber with a gate at one end of the chamber, a compressive arm, and a compressive plate adapted for motion along the longitudinal dimension of the compressive chamber. Pinestraw is loaded at the gate end of the compressive chamber and the compressive plate and compressive arm are moved from the opposite end of the compressive chamber toward the gated end of the compressive chamber compressing the pinestraw contained in the compressive chamber. The compressive motion of the compressive plate and compressive arm is stopped when the pinestraw is compressed to the desired size. The compressed pinestraw is tied off into a bale through slots in the compressive chamber, the gate, and the compressive plate. Once the compressed pinestraw is tied off into a bale, the gate at one end of the compressive chamber is opened. The compressive plate and compressive arm are extended further to force the now baled pinestraw out of the end of the pinestraw baler, so that the process of loading pinestraw and compression into a bale can begin again. The device is equipped with wheels. A power source is provided for powered motion of the compressive arm and for powered motion of the device.

18 Claims, 5 Drawing Sheets

MOBILE PINESTRAW BALER

FIELD OF THE INVENTION

This invention relates to a mobile apparatus to be used to provide a power compressive stroke to bale pinestraw.

BACKGROUND OF THE INVENTION

Pine trees shed their needles every year. The needles, once off the tree are usually referred to as pinestraw. These needles may be used as ground cover or as mulch, especially in home or garden applications. Pinestraw is baled and sold commercially for this purpose from a number of different pine tree species. However, the most desirable type of baled pinestraw is the needle from the Longleaf Pine also called the Southern White Pine or Southern Yellow Pine. This was once the dominant tree species in the southeastern coastal plains of the United States. However, the heart wood of this tree was highly valued as lumber and these forests were logged to the point of exhaustion by the beginning part of the Twentieth Century. The Longleaf Pine is relatively slow growing, compared to other species like the Loblolly Pine. The quicker growing species of pine are grown in pine tree plantations for use as telephone poles and for lumber. However, the pine needles from these species are rarely commercially baled. They are not as durable, nor do they provide as effective a mulch and ground cover as does the pinestraw from the Longleaf Pine.

There are remaining stands of Longleaf Pine and there is a small, but growing, amount of Longleaf Pine being planted and grown commercially for lumber. Although the trees are slow growing and take a long time to mature before the lumber can be harvested, the heart wood of the Longleaf Pine is so durable and beautiful that is can be sold for a premium price for such things as flooring and paneling. Therefore, there is enough Longleaf Pinestraw available to make it commercially feasible to rake and bale this pinestraw for sale to nurseries, home garden centers, and the like for resale at approximately four to five dollars a bale for landscaping or other home use. However, raking and baling pinestraw in a pine forest presents difficulties not usually encountered in an ordinary agricultural operation of raking and baling straw.

There are many power machines designed to rake and bale various types of fibrous material including cotton, wheat straw, hay and the like. For example U.S. Pat. No. 4,401,022, Vissers et al., discloses a device for raking and baling an agricultural crop. There is a power rake device that automatically loads the material raked into a compression chamber where it is compressed into a bale and subsequently ejected from the device. A different device for compressing a crop into bales is disclosed in U.S. Pat. No. 4,170,934, Oosterling et al. This discloses a compressing chamber opening and pressing member, along with a feeder mechanism for introducing the crop into the compression chamber. This device is designed to be operated continuously for rapid production of baled crops.

However, these devices, as useful as they may be for baling hay or wheat straw are useless for baling pinestraw. Unlike hay or wheat, which is grown on a prepared and cultivated field, pinestraw is found in forests. It is a serendipitous byproduct and not the outcome of an agricultural program. A mature Longleaf Pine forest will have tree roots, rocks, saplings, vines, bushes, and small trees that like shade, such as Redbud and Dogwood, scattered throughout the floor of the forest where the pinestraw must be raked and baled. The trees themselves, unless planted, grow randomly with no set distances between rows or furrows like one may find in a cultivated wheat or hay field.

To date the pinestraw baling industry is dominated by hand labor. The team of workers first rakes the pinestraw into piles. Then, a hand powered baler is placed near the piles of pinestraw and one bale is prepared at a time by hand labor. The hand operated pinestraw baler consists of a rectangular chamber of the approximate width and depth of a bale of pinestraw, but somewhat longer overall than a finished bale of pinestraw. This rectangular chamber is open at the top with a gate or door running along a length-wise portion of the rectangular chamber. Pinestraw is pushed into the open top of the chamber by a pitchfork. When the chamber is approximately filled to the top, a compressive stroke is applied by a lever-like device which pivots at a point near the top of the rectangular chamber. This compresses the pinestraw to some degree. Usually the chamber has to be filled, then "topped off" several times with a compressive stroke applied after each fill or "top off" to result in one appropriately compact mass of pinestraw. The mass is then tied into a moveable compact bale by twine or wire. The length-wise door is opened and the bale is removed by hand and placed aside. The door is then closed and the process begins again. Considerable effort is required to compress the pinestraw into a bale by means of the hand operated lever and considerable effort is required to remove the completed bale from the compression chamber.

Consequently, it would be an advance in the art to provide mechanically powered pinestraw baler. It should be light enough so that a single operator can maneuver it in a pine forest over tree roots, small bushes and other obstacles. It should be small enough in size to where it will easily fit between pine trees that may be growing close to each other and to be maneuvered around obstacles like rocks or small trees that are too large to go over. It should compress the pinestraw into a bale in a single compressive stroke, simplifying the loading operation. It should automatically eject the baled pinestraw from the compression chamber once the baling process is complete to reduce the physical labor required of the operator. It should be mechanically simple to avoid fouling or jamming which can be a common problem in a pinestraw baling application because of pine cones, branches, vines and other material which are inevitably raked and gathered along with the desirable pinestraw.

SUMMARY OF THE INVENTION

The current mobile, powered pinestraw baler is a narrow, wheeled device with one long central frame. Mounted on this frame is a compressive arm adapted to reciprocate through an opening into a compression chamber laterally mounted on the frame. The compressive chamber is the width and depth of a bale of pinestraw. However, its length is substantially larger than a bale of pinestraw and designed so that when the compression chamber is full of lightly packed pinestraw, then that amount of pinestraw, when compressed, will form one fully compressed, appropriately sized bale of pinestraw. At an end of the compressive chamber is a discharge outlet which has a door that opens and closes. The door is open for the loading of the compression chamber, closed during the compressive stroke and opened again for ejection of the finished pinestraw bale from the device. The power for the compressive stroke will ordinarily be from a gasoline engine. The compression can be provided by a hydraulic pump powered by the engine or by a gear and pulley arrangement to power the compressive arm that extends along the frame from the power source to the inlet port.

DETAILED DESCRIPTION OF THE DRAWINGS

Figure 1:
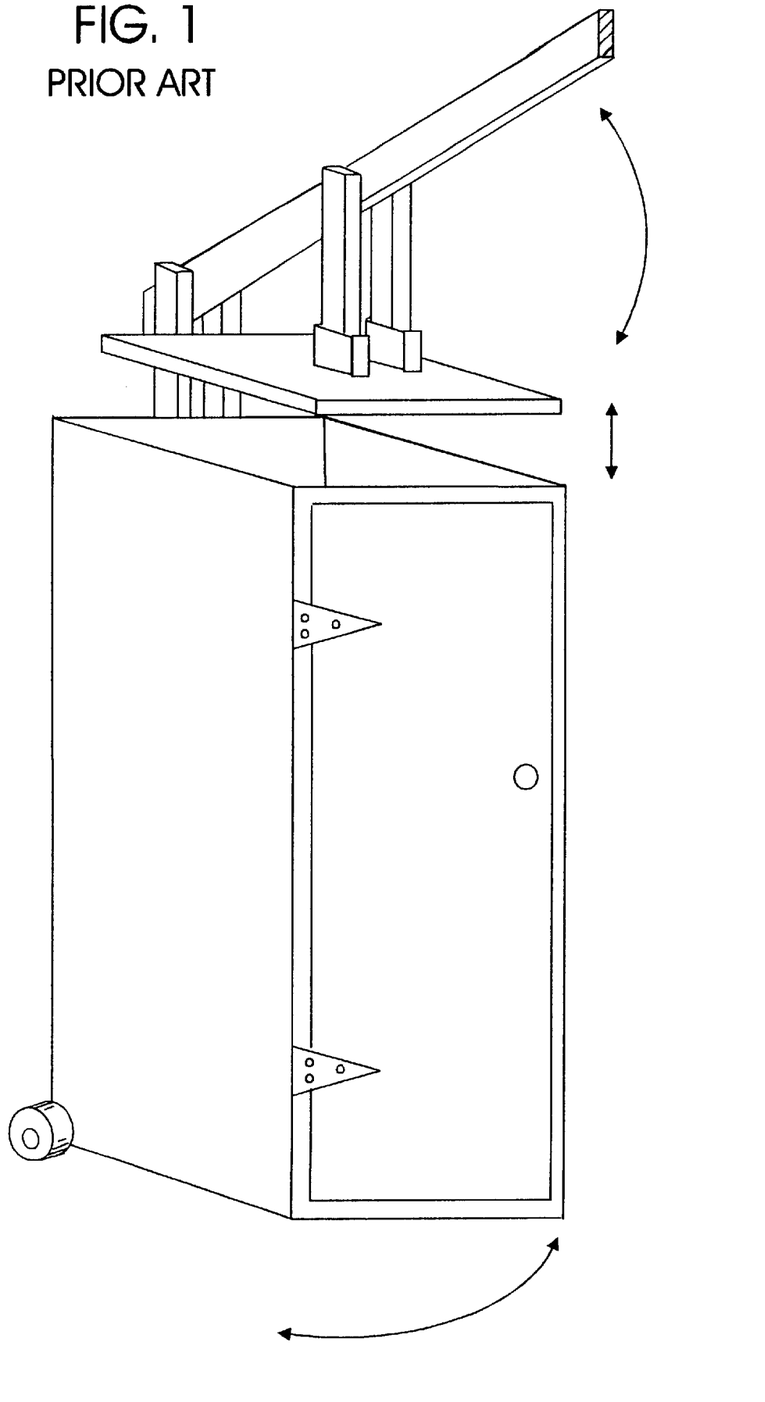
FIG. 1 shows a prior art handpowered pinestraw baler.

FIG. 1 shows a prior art handpowered pinestraw baler. This simply consists of a rectangular box usually with small wheels at one end of the box. There is a door in the longitudinal side of the box that opens and closes for removal of a finished pinestraw bale. The upper end of the box is open. Pinestraw is loosely placed in the box at the open end with the side door closed. An arm with a compressive plate is attached above the pinestraw baler. Once the pinestraw box is loosely filled, a compressive stroke is applied by the operator by pulling down on the arm which forces the compressive plate downward in the longitudinal direction in the rectangular box. This compresses the pinestraw now contained in the box. The arm is then raised, removing the compressive plate from the box and further pinestraw is loaded. Ordinarily several "top off" and compressive strokes are required before the pinestraw bale is sufficiently compressed so that it can be hand tied by the operator of the pinestraw baler. A tied bale may ordinarily be loaded and unloaded several time before reaching a final destination where the baling material will be cut and the unbaled pinestraw spread for use. Thus, the bale of pinestraw must be compressed enough during the baling operation so that the resulting tied together bale will stay together during the repeated loading and unloading. This level of required compression means that the operator must have considerable strength.

Once the bale is compressed and tied, the door is opened and the now finished pinestraw bale is removed from the box and place aside. The door is closed and the process begins again. The lever that applies the compressive stroke gives a mechanical advantage to the operator. Nevertheless, considerable effort is required to sufficiently compress the pinestraw. Ordinarily, the operator is required to apply all of his weight to the compressive stroke. Additionally, the finished pinestraw bale must be removed by hand by the operator. The labor to rake the pinestraw and to place it within the compression chamber is light and does not require any particular strength. However, both the compressive stroke and the removal of the pinestraw bale from the compression chamber require considerable physical strength on the part of the operator. Raking the pinestraw is light labor, but hand baling it is hard physical labor and requires substantially more strength and endurance from the operator and increases the risk of injury. When the pinestraw in an area is all baled, then the operator rolls the baler on the wheels to a new area to begin the operation again.

Figure 2:
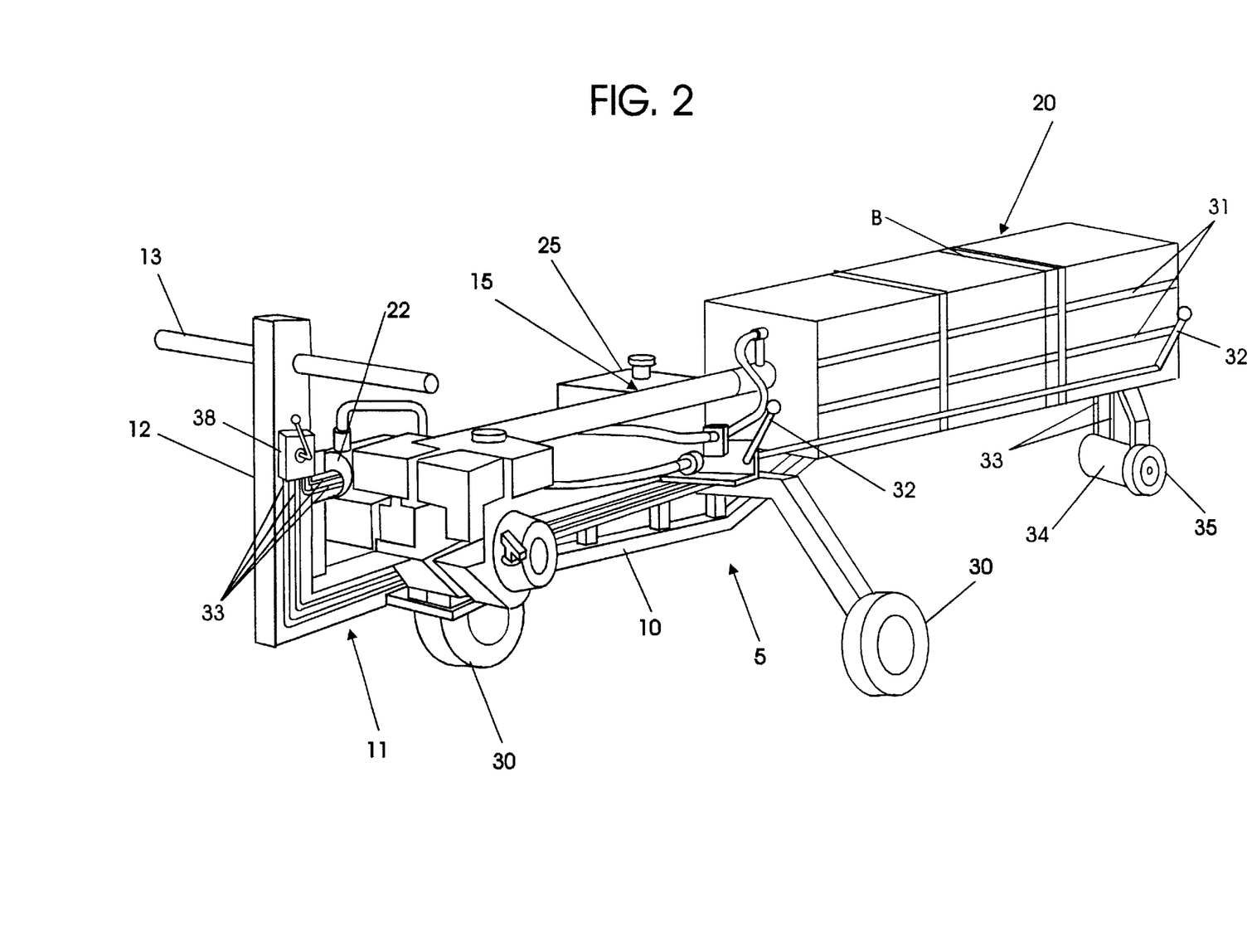
FIG. 2 is a perspective view of the current invention.

FIG. 2 is a perspective view of the mobile pinestraw baler (5). There is a central support frame (10). This support frame (10) has a main transverse longitudinal piece (11) and a shorter vertical piece (12). The compression chamber (20) is mounted on the transverse longitudinal piece (11) at a distance for the vertical support piece (12). The compression chamber (20) is a roughly parallelepiped box. The longitudinal side of the compression chamber (20) is placed on and parallel to the transverse longitudinal piece (11) of the support frame (10). The support frame (10) has wheels (30) mounted near the center of gravity of the mobile pinestraw baler (5). There is also a pivoting wheel (35) pivotally mounted near one end of the compressive chamber (20). This pivoting wheel (35) is removably attached. A trailer hitch may be attached at the same end of mobile pinestraw baler (5) where the pivoting wheel (35) is attached. The trailer hitch is used to attach the mobile pinestraw baler (5) to a truck or other transport means for long distance travel such as from one pine forest to another. For the short distance travel required in a pine forest, an operator takes the handle (13), located at the end of the vertical piece (12) of the support frame (10), and guides the mobile pinestraw baler (5) using the wheels (30) and pivoting wheel (35). A hydraulic motor (34) may be used to propel the mobile pinestraw baler (5). The hydraulic motor (34) is attached to the pivoting wheel (35). Hydraulic lines (33) connect the hydraulic motor (34) to an adjustable flow control valve (38) which is mounted on the vertical support piece (12) in close proximity to the handle (13). Other hydraulic lines (33) connect an adjustable flow control valve (38) to the hydraulic pump (22). Ordinarily, the mobile pinestraw baler (5) would not be in motion as it was baling pinestraw. However, the operator may desire to move it to another location once all the pinestraw located in a reasonably convenient distance from the current location of the mobile pinestraw baler (5) has been baled. Hence, it is easy to use the adjustable flow control valve (38) to obtain motive power from the hydraulic motor (34) mounted on the pivoting wheel (35). The hydraulic motor (34) will only move the pinestraw baler at a relatively slow walking pace. But that, ordinarily, is sufficient for motion within a longleaf pine forest where the mobile pinestraw baler (5) will ordinarily be used. The addition of the hydraulic motor (34) to the pivoting wheel (35) only requires appropriate hydraulic lines (33), couplers, and the adjustable flow control valve (38). The exact arrangement of the hydraulic hoses, coupling valves, and the like are matters of manufacturing convenience and choice of the designer. Additionally, the operator could use the handle (13) and manual power to roll the pinestraw balers on the wheels (30) and pivoting wheel (35) to a new location. A compressive arm (15) is oriented parallel to the transverse piece (11) of the support beam (10). In most circumstances the compressive arm (15) will be powered by the gasoline engine powered hydraulic pump (22), which uses hydraulic fluid stored in the reservoir (25) to extend the compressive arm (15) within the compressive chamber (20) to compress the pinestraw contained therein for appropriate baling. The extension and retraction of the compressive arm (15) is controlled by the operating controls (32) usually located at each end of the compressive chamber (20). Within the compressive chamber (20) are lengthwise lots (31), usually two in number, located along the longitudinal side of the compressive chamber (20). These are used for the baling of the compressed bale of pinestraw within the compressive chamber (20).

Figure 3:
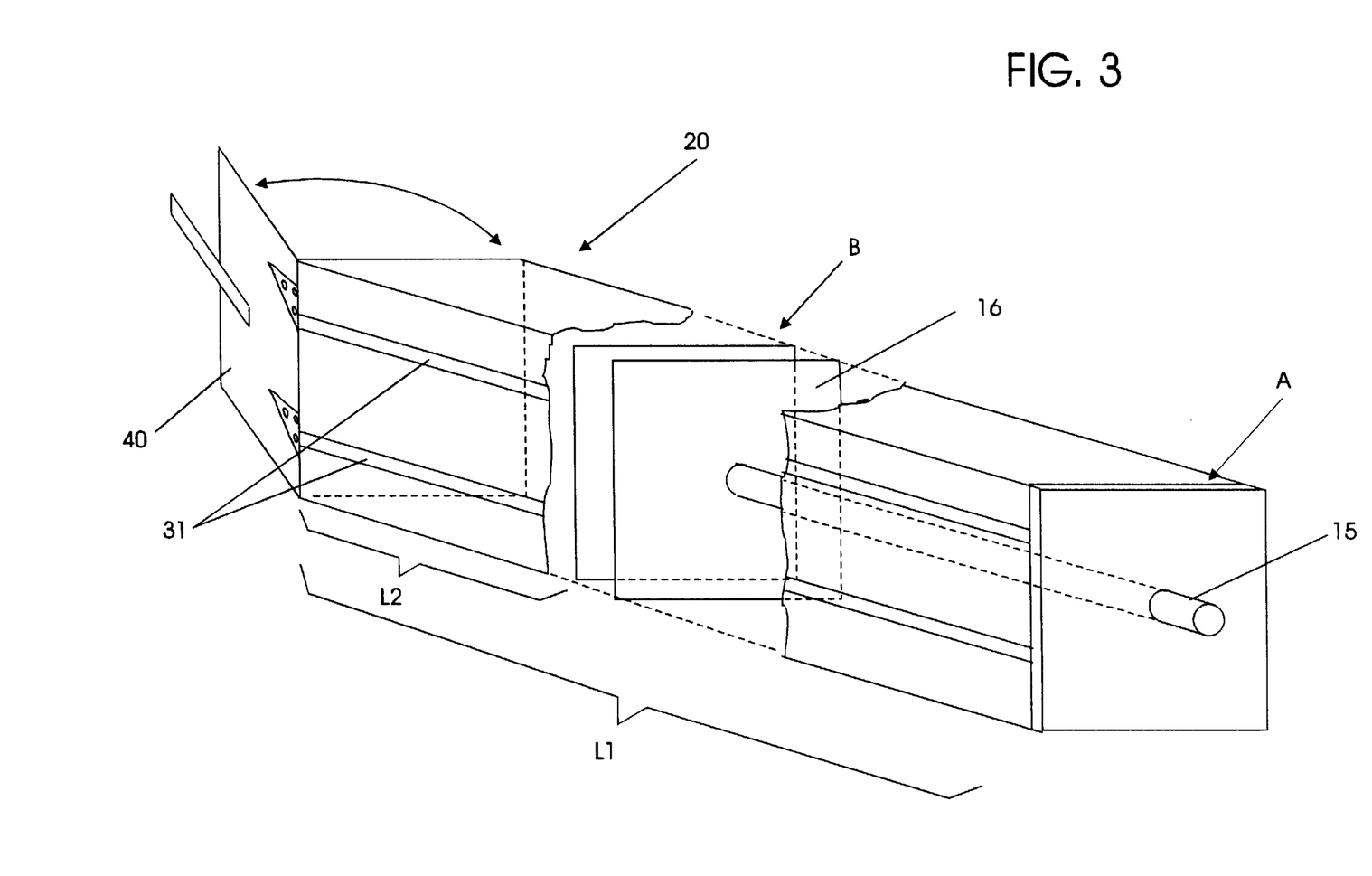
FIG. 3 is a perspective detailed view of the compression chamber of the current invention.

FIG. 3 is a perspective detail view of the compression chamber (20). A portion is cut away for better visualization. In the cutaway portion, the compressive plate (16) is shown. It is the same width and depth as the compressive chamber (20) and is mounted on an end of the compressive arm (15) opposite from where the compressive arm (15) is braced at the vertical piece (12). Once the mobile pinestraw baler (5) is in place in a pine forest, the loading gate (40) is opened as is shown by arrows in FIG. 3. The operating controls (32) are activated so that the compressive plate (16) is fully withdrawn to position A which is in close proximity to a end of the compressive chamber (20) opposite from the loading gate (40). Pinestraw is placed in the now open end of the compressive chamber (20) by pushing it into the open end of the compressive chamber. Pinestraw is loosely packed into the compressive chamber (20) until the compressive chamber (20) is full all the way from the opening at the loading gate (40) to the compressive plate (16) now at position A. The compressive chamber is sized so that when pinestraw is packed into the compressive chamber (20) by use of moderate hand pressure, a suitably compact and compressed bale of pinestraw will result following a compressive stroke of appropriate length. Ordinarily the compressive chamber (20) is approximately six feet in length, shown as distance (L1) on FIG. 3. When the compressive chamber (20) is full, the loading gate (40) is closed and latched into place as shown by the arrow. The operator then activates the hydraulic pump (22). He then uses the operating controls (32) to engage the compressive arm (15) which extends moving the compressive plate (16) from position A to position B. The pinestraw contained within the compressive chamber has been necessarily compressed from its original volume as determined by the distance (L1) to a reduced volume determined by the distance (L2). Ordinarily (L2) is approximately 23 inches. The operator then bales the compressed bale of pinestraw in the compressive chamber (20) through slots (31) provided in the sides of the compressive chamber for that purpose. Once the pinestraw is fully baled, the loading gate (40) is moved to the open position as shown in FIG. 3 and the operator then uses the operating controls (32) to further extend the compressive plate (16) by means of a compressive arm (15) to the end of the compressive chamber in close proximity to the loading gate (40). This causes the now baled pinestraw to fall out of the open end of the compressive chamber (20) onto the ground. The operating controls (32) are used to withdraw the compressive plate to its original position A and the loading process may begin again. In some circumstances, it may be appropriate to add a second gate longitudinally along one side of the compressive chamber (20). Some operators may prefer the option of manually unloading baled pinestraw from the compressive chamber (20) from a longitudinally mounted gate.

Figure 4:
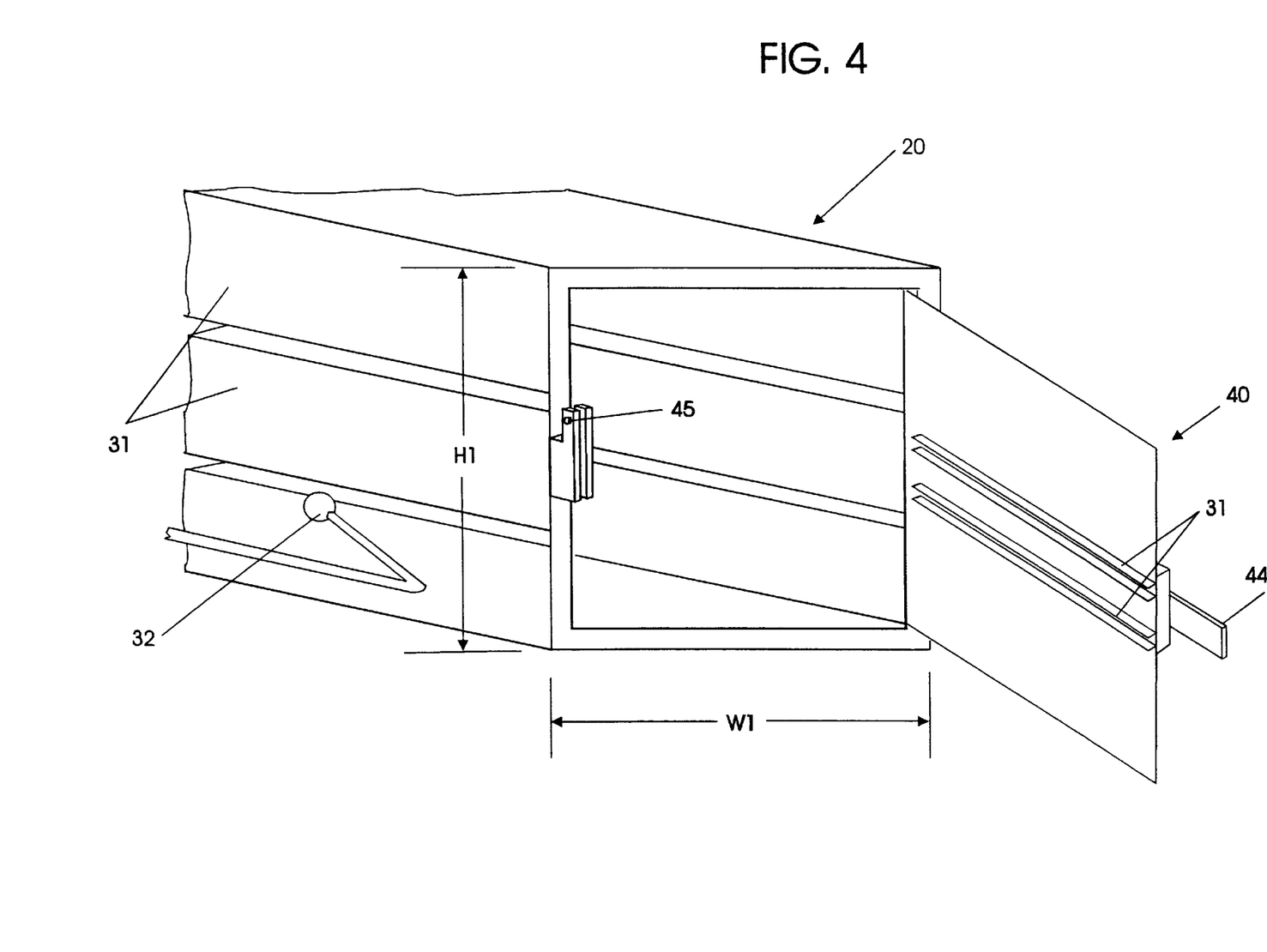
FIG. 4 is a detailed view of the loading gate and open end of the compressive chamber of the current invention.

FIG. 4 shows the loading gate (40) and the open end of the compressive chamber (20) in greater detail. The loading gate (40) is simply a door mounted on hinges with a pivoting handle (44) that latches by a U-shaped hook (45). The compressive chamber (20) is slightly higher than it is wide with a height (H1) being approximately 14 and ½ inches and the width (W1) being approximately 11 and ½ inches. This is the approximate width and height of a bale of pinestraw. The opening is large enough to allow the operator to easily use a baling fork, pitch fork or the like to place pinestraw in the open end of compressive chamber (20). The operator simply places pinestraw in the open end of the compressive chamber and pushes it back. As more pinestraw is placed into the chamber, each successive act of pushing the pinestraw moves the pinestraw along the chamber until it approaches the compressive plate (16) which is then at position A shown in FIG. 3. Once the pinestraw has filled the compressive chamber all the way to the compressive plate (16), the operator exerts a moderate amount of hand force to loosely pack the pinestraw in the compressive chamber. The loading gate (40) is closed and latched and the operating controls (32) are used to cause a compressive stroke which moves the compressive plate (16) from position A to position B as shown in FIG. 3. Operating controls (32) for the compressive arm (15) are located at each end of the compressive chamber (20). Ordinarily the operator will move away from the loading gate (40) and stand to the side of the compressive chamber (20) which assures safety of the operator in the event of some untoward event so that the loading gate should open unexpectedly with the force applied by the compressive arm (15) as it is applying a compressive stroke. Once the compressive plate (16) has reached the point (B) so that the pinestraw in the compressive chamber has been compressed from its original lengthwise dimension of approximately six feet (L1) to a finished bale size of approximately twenty three inches in length (L2), the operator then moves to the appropriate part of the compressive chamber (20) and ties off the pinestraw. Slots (31) are provided on the sides the compressive chamber (20) and on the inside face of the loading gate (40) and on the inside face of the compressive plate (16) to facilitate baling.

Figure 5:
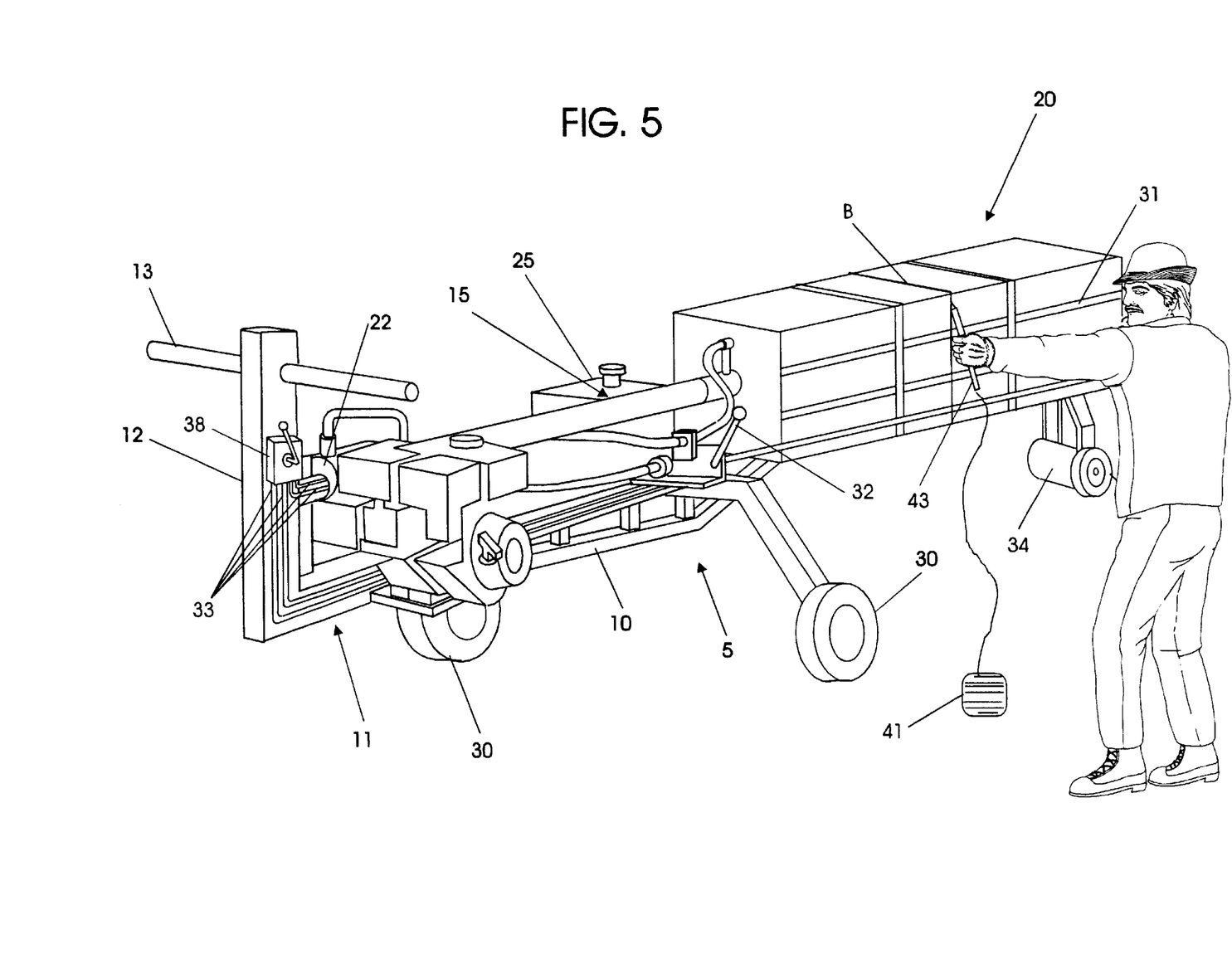
FIG. 5 shows the current invention during a portion of the baling process.

FIG. 5 shows how the bales are tied off and the tied bale ejected from the mobile pinestraw baler (5) in more detail. The operator stands along a longitudinal side of the compression chamber (20) near the end of the compression chamber where the loading gate (40) is latched by the handle (44). Twine or baling wire (41) is threaded through a thin metal rod or spindle (43) longer than the compression chamber (20) is wide. There are slots (31), usually two, in the sides of the compression chamber (20) and on the inside face of the loading gate (40) and of the compressive plate (16) which are in alignment with each other. The operator threads the spindle (43) attached to wire or baling twine (41) through a slot (31) at position B from one side of the compression chamber to the opposite side of the compression chamber. The spindle (43) slides through the slot in the face of the compressive plate (16) to emerge from the slot (31) on the other side of the compression chamber (20). The spindle (43) is then pulled, which pulls the attached twine or wire (41) until sufficient slack twine or wire (41) is in place so that the spindle (43) may be passed through the opposing slot in the inside face of the loading gate (40). The baling wire (41) is cut leaving some slack to effectuate tying off the bale. This results in two opposite ends of the twine or baling wire (41) now facing each other so they may be tied off forming a complete loop around the compressed pinestraw inside the compression chamber. The loop is tightened and tied into place. The process is repeated in the other slot (31), which results in two separate loops of twine or wire (41) tied in a lengthwise dimension around the bale of the pinestraw which is in the compression chamber and tightly compressed from position B to the loading gate (40). The operator then opens the loading gate (40) by means of the handle (44) and engages the operating control (32) to further extend the compressive arm (15) and the compressive plate (16) toward the end of the compressive chamber (20) where the loading gate (40) is located. This extension moves the now tied off bale of pinestraw initially partly out of the compression chamber (20). Once the compressive arm (15) and the compressive plate (16) approach the end of the compressive chamber (20) near the loading gate (40), the now baled pinestraw will fall on the ground to be removed by an operator or by a co-worker. The loading gate (40) is still open and the operator then engages the operating controls (32) to withdraw the compressive arm (15) and the compressive plate (16) back to position A and pinestraw may be again loaded into the compressive chamber (20) so that another bale of pinestraw may be completed.

The use of a compressive arm that travels along a longitudinal axis to apply a direct compressive stroke reduces the risk of fouling and jamming and provides even pressure on the pinestraw. This makes the process of tying off the pinestraw into a bale simpler and the resulting bale more compact and durable for stacking and moving in transit. The use of an appropriately sized compressive chamber, so that the chamber need be filled only once and only one compressive stroke applied, saves time. In the prior art, usually there is more than one fill, compression, topping off fill, compression, etc. to result in an appropriately compact and compressed bale of pinestraw. However, it will be appreciated by one of ordinary skill in the art that variations in dimensions, power sources, and the like do not affect the underlying function of this invention, and the above description is not intended as a limitation on the scope of the invention.

What is claimed is:

1. a mobile pinestraw baler comprising:
    (a) a compression chamber of general parallelepiped shape having a discharge portion whereupon a closeable gate is mounted and said compression chamber having an end portion with a port therein;
    (b) means for opening said compression chamber whereby loosely packed pinestraw may be fed into said compression chamber;
    (c) and elongated wheeled frame whereby said compressive chamber is mounted at a first end of said elongated wheeled frame along a longitudinal dimension of said compression chamber;
    (d) an extendable compressive arm with a compressive plate at one end of said extendable compressive arm with said compressive plate having dimensions no larger than the height and width of said compressive chamber with said compressive plate located within said compressive chamber and with said extendable compressive arm extending from said compressive plate through said port in said end portion of said compressive chamber;
    (e) means for compressing loosely packed pinestraw in said compressive chamber into an appropriately sized and packed bale of pinestraw with a single compressive stroke of said compressive arm and said compressive plate.

2. A mobile pinestraw baler as recited in claim 1, wherein said compressive chamber is approximately six feet in length, approximately fourteen and one-half inches in height, and approximately eleven and one-half inches in width.

3. A mobile pinestraw baler as recited in claim 2, wherein said compressive plate is slightly less than approximately fourteen and one-half inches in height and slightly less than approximately eleven and one-half inches in width.

4. A mobile pinestraw baler as recited in claim 3, wherein said means for extending and withdrawing said compressive arm and said compressive plate include means for controlling said means for extending and withdrawing, whereby said compressive arm's and said compressive plate's motion through the lengthwise dimension of said compressive chamber is controllable by an operator of said mobile pinestraw baler.

5. A mobile pinestraw baler as recited in claim 4, wherein said closeable gate, said compressive plate, and said compressive chamber have at least two coordinated sets of slots whereby an operator may use a spindle and baling material to bale off pinestraw compressed within said compression chamber.

6. A mobile pinestraw baler as recited in claim 5, wherein said elongated wheeled frame has means for hitching said frame to a motor vehicle for transportation from one location to another.

7. A mobile pinestraw baler as recited in claim 6, wherein said elongated wheeled frame has at least two wheels mounted near the center of gravity of said wheeled frame.

8. A mobile pinestraw baler as recited in claim 7, wherein at a second end opposite to said first end where said compression chamber is mounted on said elongated wheeled frame there is a handle whereby an operator may roll said wheeled frame for short distances by manual power.

9. A mobile pinestraw baler as recited in claim 8, wherein said means for extending said compressive arm and said compressive plate is a hydraulic pump, a hydraulic reservoir, and means for powering said hydraulic pump whereby said compressive arm and said compressive plate are extended and withdrawn by means of hydraulic pressure.

10. A mobile pinestraw baler comprising:
    (a) a compression chamber of general parallelepiped shape having a discharge portion whereupon a closeable gate is mounted and said compression chamber having an end portion with a port therein;
    (b) means for opening said compression chamber whereby loosely packed pinestraw may be fed into said compression chamber;
    (c) an elongated wheeled frame whereby said compressive chamber is mounted at a first end of said elongated wheeled frame along a longitudinal dimension of said compression chamber;
    (d) an extendable compressive arm with a compressive plate at one end of said extendable compressive arm with said compressive plate having dimensions no larger than the height and width of said compressive chamber with said compressive plate located within said compressive chamber and with said extendable compressive arm extending from said compressive plate through said port in said end portion of said compressive chamber;
    (e) means for slow speed powered motion of said wheeled frame;
    (f) means for compressing loosely packed pinestraw in said compressive chamber into an appropriately sized and packed bale of pinestraw with a single compressive stroke of said compressive arm and said compressive plate.

11. A mobile pinestraw baler as recited in claim 10, wherein said compressive chamber is approximately six feet in length, approximately fourteen and one-half inches in height, and approximately eleven and one-half inches in width.

12. A mobile pinestraw baler as recited in claim 11, wherein said compressive plate is slightly less than approximately fourteen and one-half inches in height and slightly less than approximately eleven and one-half inches in width.

13. A mobile pinestraw baler as recited in claim 12, wherein said means for extending and withdrawing said compressive arm and said compressive plate include means for controlling said means for extending and withdrawing, whereby said compressive arm's and said compressive plate's motion through the lengthwise dimension of said compressive chamber is controllable by an operator of said mobile pinestraw baler.

14. A mobile pinestraw baler as recited in claim 13, wherein said closeable gate, said compressive plate, and said compressive chamber have at least two coordinated sets of slots whereby an operator may use a spindle and baling material to bale off pinestraw compressed within said compression chamber.

15. A mobile pinestraw baler as recited in claim 14, wherein said elongated wheeled frame has means for hitching said frame to a motor vehicle for transportation from one location to another.

16. A mobile pinestraw baler as recited in claim 15, wherein said elongated wheeled frame has at least two wheels mounted near the center of gravity of said wheeled frame.

17. A mobile pinestraw baler as recited in claim 16, wherein said means for extending said compressive arm and said compressive plate is a hydraulic pump, a hydraulic reservoir, and means for powering said hydraulic pump whereby said compressive arm and said compressive plate are extended and withdrawn by means of hydraulic pressure.

18. A mobile pinestraw baler as recited in claim 17, wherein said means for slow speed powered motion of said wheeled frame is a third wheel at said first end of said elongated wheeled frame with said third wheel driven by a hydraulic motor powered by said hydraulic pump and controlled by a variable flow valve.

* * * * *